(12) United States Patent
Wojcik

(10) Patent No.: US 11,847,171 B2
(45) Date of Patent: Dec. 19, 2023

(54) FACILITATING BLOCKCHAIN TRANSACTIONS WITH AN INTERNET OF THINGS (IOT) DEVICE

(71) Applicant: International Business Machines Corporation, Armonk, NY (US)

(72) Inventor: Marci Ramona Wojcik, Grand Blanc, MI (US)

(73) Assignee: International Business Machines Corporation, Armonk, NY (US)

(*) Notice: Subject to any disclaimer, the term of this patent is extended or adjusted under 35 U.S.C. 154(b) by 269 days.

(21) Appl. No.: 16/545,772

(22) Filed: Aug. 20, 2019

(65) Prior Publication Data
US 2021/0056141 A1    Feb. 25, 2021

(51) Int. Cl.
| | |
|---|---|
| G06F 16/9038 | (2019.01) |
| G06F 16/9035 | (2019.01) |
| H04L 9/06 | (2006.01) |
| H04L 67/12 | (2022.01) |
| H04L 51/06 | (2022.01) |
| H04L 43/08 | (2022.01) |
| H04L 9/00 | (2022.01) |

(52) U.S. Cl.
CPC ...... *G06F 16/9038* (2019.01); *G06F 16/9035* (2019.01); *H04L 9/0643* (2013.01); *H04L 43/08* (2013.01); *H04L 51/06* (2013.01); *H04L 67/12* (2013.01); *H04L 9/50* (2022.05)

(58) Field of Classification Search
CPC ....... H04L 43/08; H04L 51/066; H04L 51/06; H04L 67/2823; H04L 2209/38; H04L 9/0643; H04L 12/4625; H04L 67/12; H04L 9/3239; G06F 16/9038; G06F 16/9035; H04W 4/70

USPC ........................................................ 707/722
See application file for complete search history.

(56) References Cited

U.S. PATENT DOCUMENTS

| 9,635,000 B1* | 4/2017 | Muftic ................. H04L 9/3239 |
| 11,030,161 B2* | 6/2021 | Letz .................... G06F 16/1834 |

(Continued)

OTHER PUBLICATIONS

Hertig, "Bitcoin's Lightning Comes to Apple Smartwatches With New App", May 5, 2019, Retrieved from https://www.coindesk.com/bitcoins-lightning-comes-to-apple-smartwatches-with-new-app, 4 pgs.

(Continued)

*Primary Examiner* — Wing F Chan
*Assistant Examiner* — John Fan
(74) *Attorney, Agent, or Firm* — Peter J. Edwards

(57) ABSTRACT

A system and method for facilitation transactions between an Internet of Things (IoT) system and a blockchain peer without the use of a smart phone are disclosed. The system may have security, a channel manager, a message formatter, parameter enumerator and formatter, a final formatter, a notifier, a monitor and an integrator. The system may accept blockchain queries from the IoT device and may reformat the blockchain queries and alter parameters into a format and parameter framework which is operable by a blockchain peer. The system may also accept responses from the blockchain peer and may reformat the response and alter parameters into a format and parameter framework which is operable by the IoT device. The system may send the reformatted response to the IoT device for display.

17 Claims, 13 Drawing Sheets

(56) References Cited

U.S. PATENT DOCUMENTS

| | | | |
|---|---|---|---|
| 11,128,451 B2* | 9/2021 | Mondello | H04L 9/3263 |
| 11,146,555 B2* | 10/2021 | Pemmaraju | H04L 9/3239 |
| 2018/0300693 A1 | 10/2018 | Gopinath et al. | |
| 2019/0013948 A1* | 1/2019 | Mercuri | G06F 11/3072 |
| 2019/0019374 A1 | 1/2019 | Foley et al. | |
| 2019/0043050 A1* | 2/2019 | Smith | G06Q 20/223 |
| 2019/0121523 A1 | 4/2019 | Block et al. | |
| 2019/0280855 A1* | 9/2019 | Tong | G06F 16/245 |
| 2019/0317934 A1* | 10/2019 | Jentzsch | H04L 9/3218 |
| 2021/0152365 A1* | 5/2021 | Nosseir | H04L 9/321 |
| 2021/0233672 A1* | 7/2021 | Patil | G16Y 40/35 |

OTHER PUBLICATIONS

Cook, "HTC To Release Economical Blockchain Smartphone With Potential of Running A Bitcoin Full Node", Retrieved on May 16, 2019 from https://www.cryptonewsz.com/htc-to-release-economical-blockchain-smartphone/19246/, 3 pgs.
App Programming Guide for watchOS: Complication Essentials, Retrieved on May 16, 2019 from https://developer.apple.com/library/archive/documentation/General/Conceptual/WatchKitProgramming-Guide/ComplicationEssentials.html#//apple_ref/doc/uid/TP400, 3 pgs.
CLKComplicationDataSource—ClockKit | Apple Developer Documentation, Retrieved on May 16, 2019 from https://developer.apple.com/documentation/clockkit/clkcomplicationdatasource, 4 pgs.
ClockKit | Apple Developer Documentation, Retrieved on May 16, 2019 from https://developer.apple.com/documentation/clockkit, 4 pgs.
Angrish et al., "A Case Study for Blockchain in Manufacturing: "FabRec": A Prototype for Peer-to-Peer Network of Manufacturing Nodes," Science Direct, Procedia Manufacturing, 2018, pp. 1180-1192.
Gadekar et al., "Blockchain and Its Applications," International Journal of Recent Trends in Engineering and Research, vol. 03, Issue 04, Apr. 2017, pp. 143-145.
"Convolution," Wolfram MathWorld, Printed May 1, 2023, 4 pages, https://mathworld.wolfram.com/Convolution.html.
"Facer—Thousands of Free watch faces for Apple Watch," Samsung Gear S3, Huawei Watch, and more, Printed May 1, 2023, 8 pages, https://www.facer.io/.
"Android/Wear-OS-Samples," Github.com, printed 2023, 5 pages, https://github.com/android/wear-os-samples.
Bastos et al., "Classes of convolution type operators on unions of bounded intervals," Mathematische Nachrichten, Dec. 2013, 286 (17-18), pp. 1710-1725 (Abstract Only).
Chen, "What if Quantum Computers Used Hard Drives Made of DNA?" Wired, Science, Mar. 15, 2017, 11 pages, https://www.wired.com/2017/03/quantum-computers-used-hard-drives-made-dna/.
Cyran, "Blockchain as a Foundation for Sharing Healthcare Data," Blockchain in Healthcare Today, vol. 1, 2018, 7 pages, https://blockchainhealthcaretoday.com/index.php/journal/article/view/13.
Dinh et al., "Untangling Blockchain: A Data Processing View of Blockchain Systems," IEEE Transactions on Knowledge and Data Engineering, vol. 30, No. 7, Jul. 2018, pp. 1366-1385.
"Physicists Just Invented an Essential Component Needed For Quantum Computers," Futurism, Science Alert, Dec. 18, 2017, 8 pages.
O'Leary, "Configuring Blockchain Architectures for Transaction Information in Blockchain Consortiums: The Case of Accounting and Supply Chain Systems," Wiley Online Library Research Article, Dec. 6, 2017, vol. 24, Issue 4, pp. 138-147 (Abstract Only).
Pfister, Time—and frequency-resolved quantum optics for large-scale quantum computing, SPIE Newsroom, 2016, 3 pages.
Shan et al., "Quantum-entanglement storage and extraction in quantum network node," International Journal of Quantum Information, vol. 16, Issue No. 01, p. 1850009 (Abstract Only).
Zhang et al., "The IoT electric business model: Using blockchain technology for the internet of things," Springer, Peer-to-Peer Networking and Applications, 10(4), 2017, pp. 983-994 (Abstract Only).
Zyskind et al., "Decentralizing Privacy: Using Blockchain to Protect Personal Data." IEEE CS Security and Privacy Workshops, 2015, pp. 180-184.
Yu et al., "CoinExpress: A Fast Payment Routing Mechanism in Blockchain-Based Payment Channel Networks," 2018 27th International Conference on Computer Communication and Networks (ICCCN), 2018, pp. 1-9 (Abstract Only).
Naik, "Choice of effective messaging protocols for IoT systems: MQTT, CoAP, AMQP and HTTP," 2017 IEEE International Systems Engineering Symposium (ISSE), Vienna, 2017, pp. 1-7 (Abstract Only).
"Network access and sync on Wear OS," Developers Documentation, Printed May 1, 2023, 6 pages, https://developer.android.com/training/wearables/data/network-access.
"Watch face complications," Developers Documentation, Printed May 1, 2023, 2 pages, https://developer.android.com/training/wearables/tiles/complications.
"Developing Applications—Application," Github, Hyperledger Copyright 2019, Printed May 2, 2023, 8 pages, https://hyperledger-fabric.readthedocs.io/en/release-1.4/developapps/application.html.
"Developing Applications—The Scenario," Github, Hyperledger Copyright 2019, Printed May 2, 2023, 3 pages, https://hyperledger-fabric.readthedocs.io/en/release-1.4/developapps/scenario.html.
Wu et al., "Hyperledger Cookbook," Review of Hyperledger Fabric Architecture and Components, Printed May 24, 2023, 2 pages, https://subscription.packtpub.com/book/big-data-and-business-intelligence/9781789534887/pref.
Sridharan, "The IoT's Future Banks on LTE Connectivity," Microwaves & RF, May 21, 2019, 6 pges, https://www.mwrf.com/technologies/systems/article/21849731/skyworks-the-iots-future-banks-on-lte-connectivity.

* cited by examiner

US 11,847,171 B2

FACILITATING BLOCKCHAIN TRANSACTIONS WITH AN INTERNET OF THINGS (IOT) DEVICE

TECHNICAL FIELD

The disclosure relates to transactions with Internet of Things (IoT) devices.

BACKGROUND

The IoT is growing and will continue to develop as more smart devices are entering the marketplace. At the same time, the use of blockchain is also growing due to the highly secure nature of blockchain and the large variety of transactions to which blockchain technology can be applied. Currently, accessing blockchain ledgers with an IoT device such as a smartwatch requires the use of a smart phone.

SUMMARY

In general, this disclosure describes the use of a system and method to facilitate blockchain transactions with an IoT device without the use of a smart phone. The system and method may provide services such as security, channel management, message formatting, parameter enumeration and formatting, final formatting, notifications, monitoring, integration and event management. As used herein, the term transaction, includes interaction, query, response, message, or any other form of data communication.

In one example, various aspects of the techniques of the present disclosure provide a system configured to facilitate transactions between an Internet of Things (IoT) device and a blockchain peer, the system comprising: a memory configured to store a blockchain query from an IoT device and a blockchain response from a blockchain peer; and one or more processors coupled to the memory, and configured to: receive the blockchain query from the IoT device; reformat the blockchain query so that it is in a first defined format for the blockchain peer; send the reformatted blockchain query to the blockchain peer; receive a response from the blockchain peer; reformat the response so that it is in a second defined format for the IoT device; and send the re-formatted response to the IoT device.

In another example, various aspects of the techniques of the present disclosure provide a method of facilitating transactions between an Internet of Things (IoT) device and a blockchain peer comprising: receiving a blockchain query from the IoT device;

reformatting the blockchain query so that it is in a first defined format for the blockchain peer; sending the blockchain query to the blockchain peer; receiving a response from the blockchain peer; reformatting the response so that it is in a second defined for the IoT device; and sending the response to the IoT device.

In yet another example, various aspects of the techniques of the present disclosure provide a computer-readable medium comprising instructions for causing one or more programmable processors to: receive a blockchain query from an Internet of Things (IoT) device; reformat the blockchain query so that it is in a first defined format for a blockchain peer; send the blockchain query to the blockchain peer; receive a response from the blockchain peer; reformat the response so that it is in second defined format for the IoT device; and send the response to the IoT device.

The details of one or more examples are set forth in the accompanying drawings and the description below. Other features, objects, and advantages will be apparent from the description and drawings, and from the claims.

DETAILED DESCRIPTION

Currently, IoT devices cannot conduct blockchain transactions without utilizing a smart phone. This is true even in the case of a smartwatch, where sophisticated and well-defined APIs exist. With the proliferation of blockchain transactions and the proliferation of IoT devices, it is desirable to enable an IoT device (e.g., a smartwatch) to access a blockchain ledger and conduct blockchain transactions without having to connect through a smart phone. For example, if the smart phone is not within the communications range of the IoT device or if the smart phone is powered off, the IoT device is unable to access blockchain ledgers and is unable to conduct blockchain transactions. Therefore, facilitating blockchain transactions with an IoT device, without the need for a smart phone, is desirable.

Figure 1:
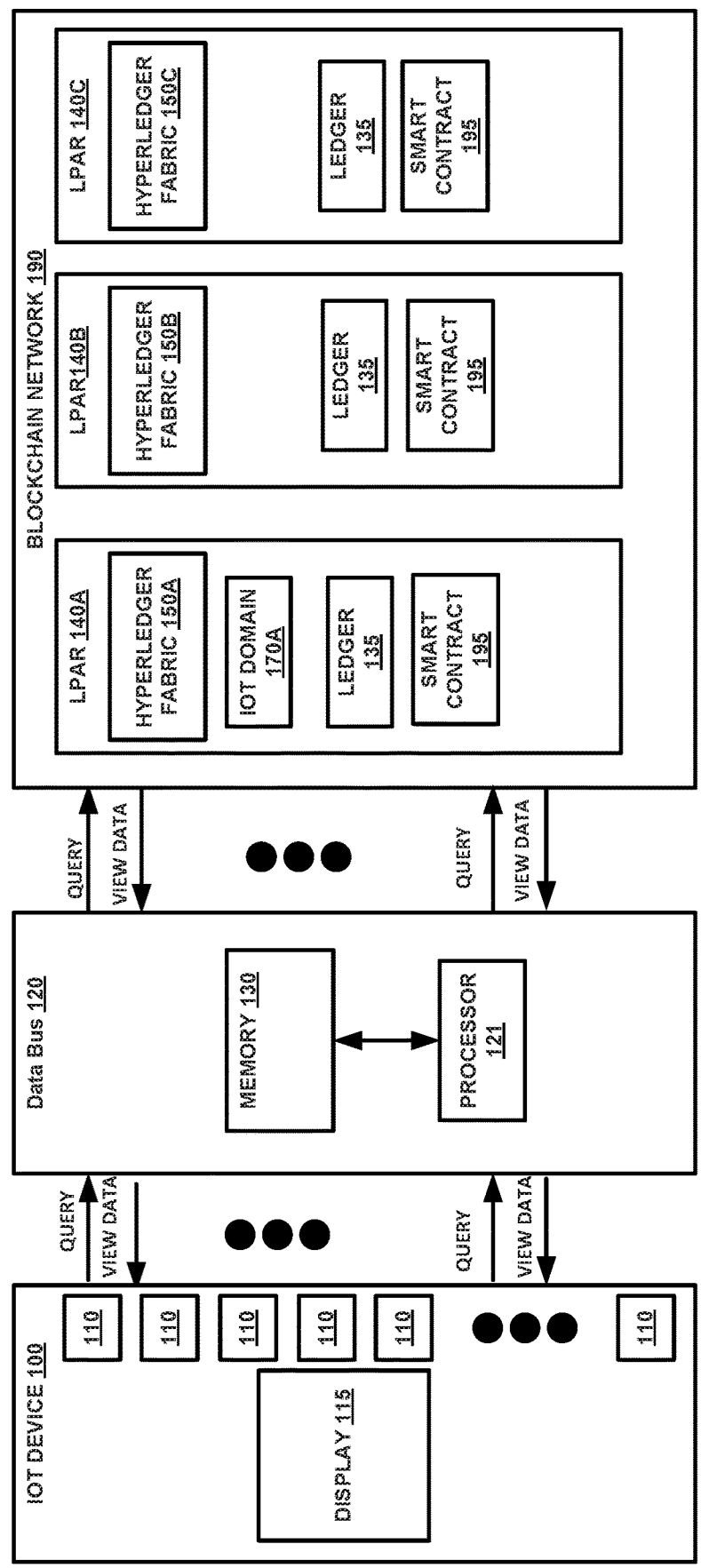
FIG. 1 is a block diagram illustrating an example IoT device communicating with a blockchain data provider through a data bus according to techniques of the present disclosure.

FIG. 1 is a block diagram illustrating an IoT device transacting with a blockchain ledger through a data bus. IoT device 100 is shown communicating with a blockchain ledger 135 through data bus 120 and LPAR 140A. Several blockchain peers are depicted as being implemented in LPAR 140A, 140B and 140C. While in this example there are three peers, there may be any number. Each peer maintains a copy of the blockchain ledger 135 and smart contract 195.

IoT device 100 is shown with a plurality of blockchain applications 110. In the example of a smartwatch, these applications are called complications. A complication is any application other than displaying time. While a smartwatch is an example of an IoT device that may be used as described in the present disclosure, the systems and methods described herein may be used with any IoT device capable of making a query and receiving response data (e.g., materialized view data). As used herein, a query may include a request for data, a request for a transaction or a request for any other blockchain operation.

Some of the applications 110 that could reside on the IoT device, by way of example, include supply chain management, financial transactions, event horizon display, network status display, web services, news feed and ticket purchase. There may be many others. IoT device 100 may also include a display system 115. In one example, the display system 115 may display the applications 100 in a graphical user interface in a way in which a user may touch a representation of a particular application in order to activate that application and transmit a query.

Data bus 120 may be a hyperledger fabric gateway that may be implemented on a server in the cloud, for example. As such, data bus may include memory 130 and one or more processors 121. Memory 130 may contain software components that, when executed, cause one or more processors 121 to facilitate transactions between IoT device 100 and blockchain ledger 135. These software components are further discussed below.

In order to conduct a blockchain transaction, there may be proper end-to-end security between IoT device 100 and hyperledger fabric 150A. In some examples, the end-to-end security is provided using role-based access control (RBAC). In some examples, the roles are propagated from IoT device 100 to data bus 120 and packaged into the blockchain query. The blockchain peers (in LPAR 140A-140C) may then respond to the RBAC to allow the permissible actions to occur, such as Read, ReadOnly, and Update. In some examples, IoT device 100, data bus 120 and hyperledger fabric 150A use a Java Web Token (JWT) to conduct transactions.

Data bus 120 dynamically configures the format and content for supported hyperledger components. In some examples data bus 120 dynamically configures hyperledger channels. In some examples, data bus 120 dynamically configures Rest API integrations. Events may be propagated from the hyperledger fabric 150A to the connected IoT device 100.

To facilitate transactions between IoT device 100 and blockchain ledger 135, data bus 120 may receive a query from IoT device 100, decrypt it, format it into the proper message format, meet the necessary protocols to transact with blockchain ledger 135 within LPAR 140A, e.g., and encrypt the message before sending it on to LPAR 140A. It may also receive a response from distributed blockchain network 190, decrypt it, format it into the proper message format, meet the necessary protocols before sending it to IoT device 100. In this way, the data bus 120 acts as a connector to facilitate transactions between the IoT device 100 and the blockchain ledger 135 without the need for a smart phone.

Data bus 120 may speak the same security language and be able to present the appropriate security credentials in a continuous manner in order to access the blockchain ledger 135 and to be able conduct blockchain transactions, such as add additional records to the ledger.

In the present example, LPAR 140A within blockchain network 190 is associated with IoT device 100 and is responsible for encrypting/decrypting, compressing and ensuring all data that is bound for the blockchain ledger 135 conforms to the correct security regime. In order to assist data bus 120 in facilitating transactions between IoT device 100 and blockchain ledger 135, LPAR 140A may contain IoT domain 170A. IoT domain 170A may be a specialized application that includes search, analytics, summary statistics, aggregation applications used in the creation of a materialized view of the ledger data filtered by input parameters it received from the data bus 120. Materialized views may then be sent back onto the data bus 120 to drive the IoT visual and transactive elements for display on display system 115.

If classical blockchain peer replication is involved, it is the responsibility of a replicator (not shown) to ensure replicated LPARs 140 contain the exact data and security regime as the original LPAR 140. Connecting to or refreshing data from any original, distributed or replicated LPAR 140 requires the immediate peer synchronization indicated from the security regime configured for the blockchain ledger 135. The data bus 120 therefore communicates to the LPAR 140A using the protocols specified by the configured security regime in the LPAR 140A. The data bus 120 may therefore be the primary agent within the security regime to ensure the IoT device 100 data feeds are properly formatted and encrypted in order to save new records to blockchain ledger 135. The data bus 120 may also be the primary agent responsible for ensuring the materialized view data it receives from the IoT domain 170A is compatible with the connected IoT device 100 for display on display system 115.

Figure 2:
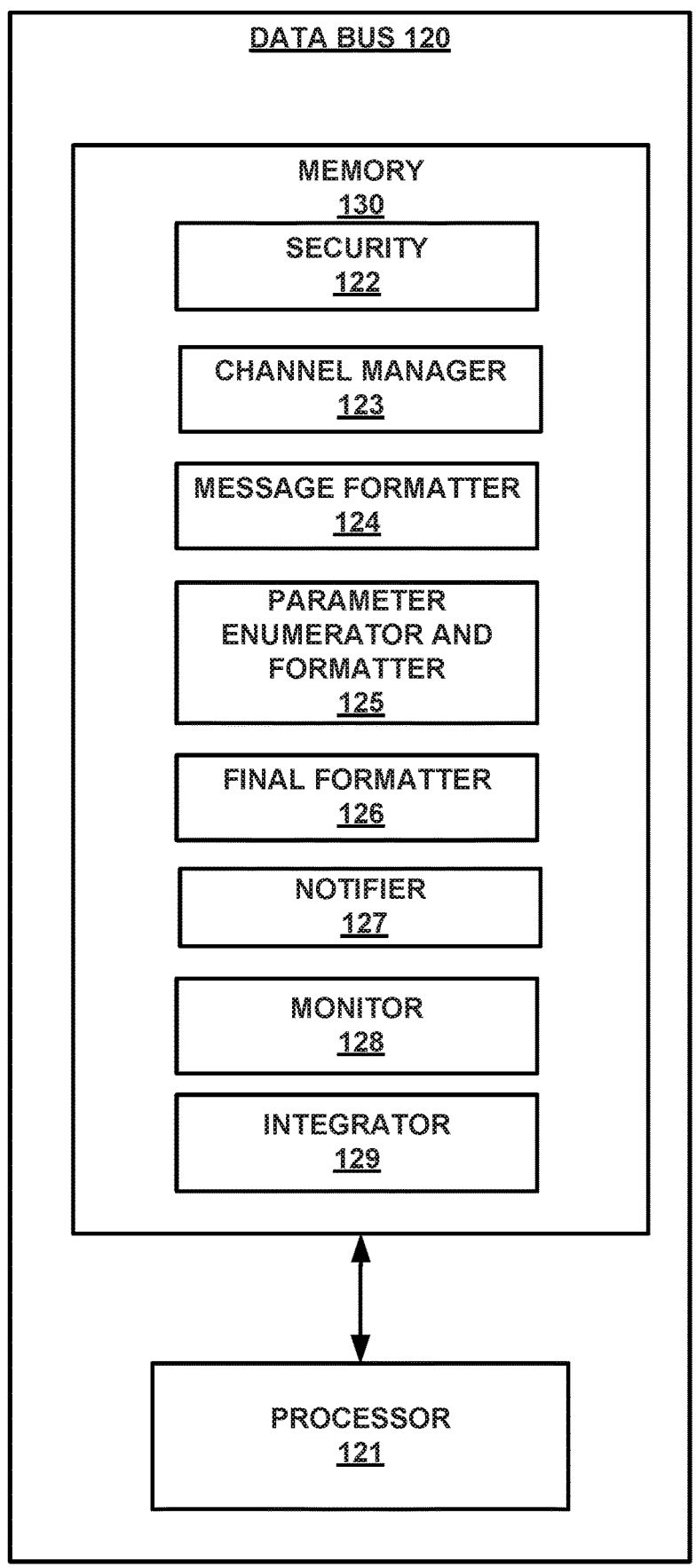
FIG. 2 is a block diagram of an example data bus according to techniques of the present disclosure.

FIG. 2 is a block diagram of data bus 120 according to the techniques of the present disclosure. Several components are shown as stored in memory 130. These components include security 122, channel manager 123, message formatter 124, parameter enumerator and formatter 125, final formatter 126, notifier 127, monitor 128 and integrator 129. While these are shown separately, they may be a single software program or may be a plurality of programs. In one example, the components 122-129 are JavaScript Object Notation (JSON) Schema files.

The components 122-129, when executed, may cause one or more processors 121 to operate in a number of ways. Security 122 may cause one or more processors 121 to encrypt messages that data bus sends to IoT device 100 and messages it sends to LPAR 140A. Security 122 may also cause one or more processors 121 to decrypt messages data bus 120 receives from IoT device 100 and from LPAR 140A. Additionally, security 122 may cause one or more processors 121 to encrypt and decrypt messages to and from other external integrations (not shown).

Channel manager 123 may cause one or more processors 121 to provide a scaling mechanism for data transmission between IoT device 100 and LPAR 140A. For example, when larger amounts of data need to be sent, channel manager 123 may cause one or more processors 121 to open a larger bandwidth channel to facilitate the transfer. This larger bandwidth channel need not be a single channel, but may be a collection of channels or a virtual channel.

Message formatter 124 may cause one or more processors 121 to format messages received from IoT device 100 with the proper format, data and parameterization that is consumable by LPAR 140A and the blockchain peer therein.

Parameter enumerator and formatter 125 may cause one or more processors 121 to enumerate and format queries from IoT device 100 for each required calling convention associated with a particular type of blockchain query.

Final formatter 126 may cause one or more processors 121 to format data that data bus 120 sends to IoT device 100 with the proper format, data and parameterization that is consumable by IoT device 100.

Notifier 127 may cause one or more processors 121 to send notifications to IoT device 100. In one example, notifier 127 may cause one or more processors 121 to send a notification to IoT device 100 based on one or more processors 121 detecting a change in the state of blockchain ledger 135.

Monitor 128 may cause one or more processors 121 to monitor each of the blockchain data feeds associated with blockchain applications 110 on IoT device 100.

Integrator 129 may cause one or more processors 121 to provide a separate channel for each block chain feed associated with the blockchain applications 110 on the IoT device. For example, one or more processors 121 may provide a financial channel for a financial blockchain data feed, a network status channel for a network status data feed, a blockchain news channel for a blockchain news feed, a web services API channel for a web services API data feed, an event horizon channel for an event horizon data feed, and a supply chain status channel for a supply chain status data feed.

Figure 3:
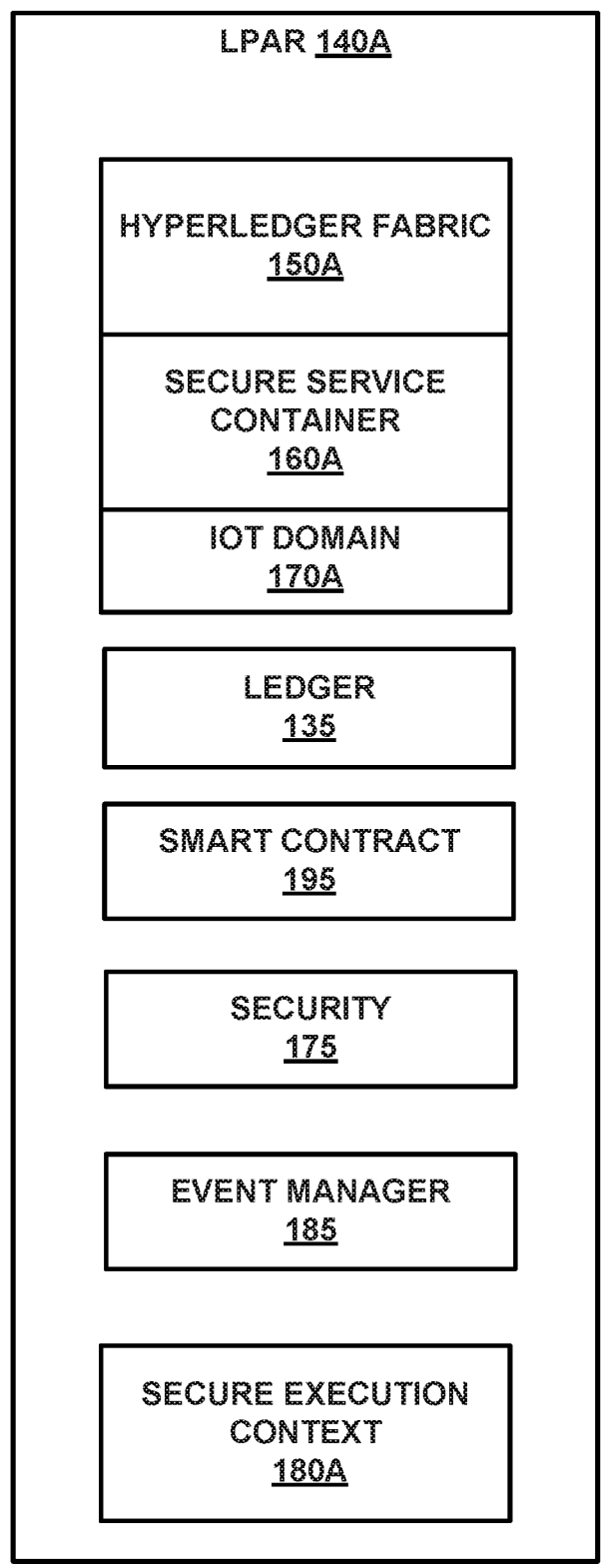
FIG. 3 is a block diagram of an example logical partition (LPAR) according to techniques of the present disclosure.

FIG. 3 is a block diagram of a blockchain peer implemented in an LPAR according to techniques of the present disclosure. LPAR 140A may contain a copy of blockchain ledger 135 and smart contract 195. LPAR 140A may also contain hyperledger fabric 150A. Hyperledger fabric 150A may include a peer. A peer is a network node that maintains the state of a blockchain ledger, in this case blockchain ledger 135, and manages chaincode. Hyperledger fabric 150A may also include an ordering service. An ordering service packages transactions into blocks to be delivered to peers. It also processes configuration transactions to set up network policies. Hyperledger fabric 150A may also include a fabric certificate authority.

LPAR 140A may include secure service container 160A and secure execution context 180A. LPAR 140A may also include IoT domain 170A. IoT domain 170A may be a specialized application that includes search, analytics, summary statistics, aggregation applications used in the creation of a materialized view of the ledger data filtered by input parameters it received from the data bus 120. IoT domain 170A may be a secure area where business logic, blockchain create-read-update-delete (CRUD) queries occur as well where the smart contract chaincode is loaded and executed to enable blockchain transactions to occur.

Although not depicted for simplicity purposes, in one example, IoT domain 170A may be located within blockchain ledger 135 itself. IoT domain 170A may be an application stored in a server or multiple servers in the cloud, for example. IoT domain 170A may be loaded and executed within LPAR 140A or a virtual machine of the blockchain ledger 135.

LPAR 140A may also contain security 175 and event manager 185. Security 175 may provide user authentication and data encryption and decryption, similar to security 122 in data bus 120. Security 175 may also include key management services and certificate authority. Event manager 185 may monitor blockchain ledger 135 for state changes. Some possible state changes include, a new transaction occurs, a view is updates, or new blockchain peers are added or deleted. When a state change occurs, event manager may report the state change to data bus 120. For example, event manager 185 may raise an event from the chaincode and propagate the event to data bus 120. In one example, this propagation is through a Rest API.

While not shown for simplicity purposes, LPAR 140A may also contain membership information, consensus information, transaction information, chaincode, governance information, blockchain administration and operations services and systems integration services.

While security 175 and event manager 185 are shown external to hyperledger fabric 150A, they may be implemented in hyperledger fabric 150A. In some examples, blockchain ledger 135, smart contract 195 and/or chaincode (not shown) may be located in IoT domain 170A.

Figure 4:
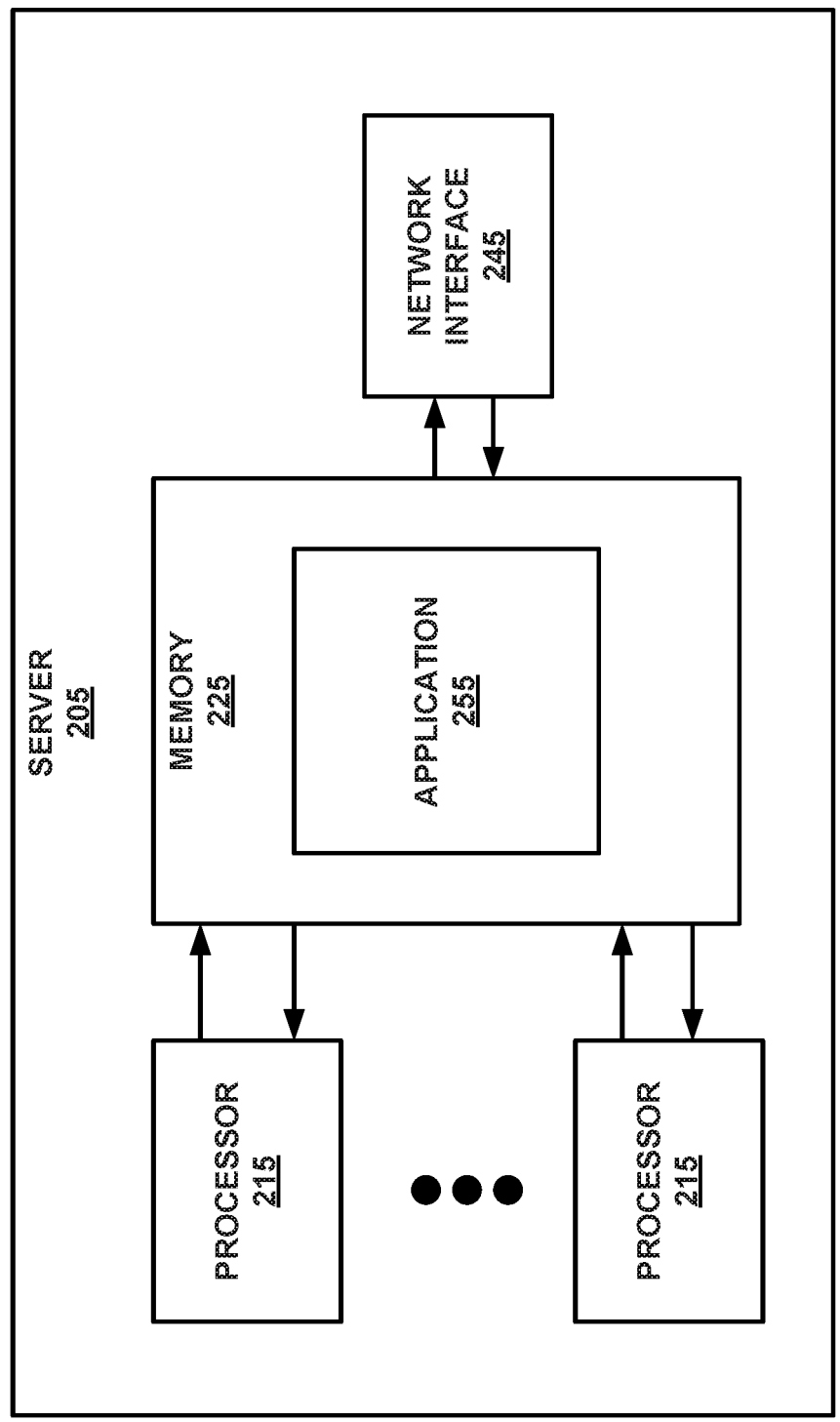
FIG. 4 is a block diagram of an example server capable of implementing a data bus and/or an LPAR according to techniques of the present disclosure.

FIG. 4 is a block diagram illustrating an example server 205 configurable to implement data bus 120. Server 205 may include a network interface 245 for communicating with IoT device 100, data bus 120 and/or LPAR 140A. Network interface 245 may include a wireless interface such as Wi-Fi, Bluetooth, or a wireless telecommunications standard, such as GSM, CDMA, W-CDMA, TS-CDMA, LTE or the fifth-generation wireless standard known as 5G. Network interface 245 may also include a wired interface such as Ethernet.

Server 205 also may include one or more processors 215 coupled to memory 225. Memory 225 may contain application 255. Application 255 may include code configured to cause the one or more processors 215 to perform each of the actions of the data bus 120, for example, based on security 122, channel manager 123, message formatter 124, parameter enumerator and formatter 125, final formatter 126, notifier 127, monitor 128 and integrator 129. While shown as a single application, application 255 may be multiple distinct applications.

As IoT devices may have different interfaces and require different data formats and protocols to communicate with them, data bus 120 may be programmable. For instance, when data bus 120 is implemented on server 205, data bus 120 may include application 155. Application 155 may contain a template that can be configured to facilitate specific blockchain transactions with a specific IoT device. Each of security 122, channel manager 123, message formatter 124, parameter enumerator and formatter 125, final formatter 126, notifier 127, monitor 128 and integrator 129 may be a programmable template to facilitate such transactions. In one example, each of security 122, channel manager 123, message formatter 124, parameter enumerator and formatter 125, final formatter 126, notifier 127, monitor 128 and integrator 129 are JSON Schema files.

Server 205 is also configurable to implement LPAR 140A. For example, application 255 may contain code for causing the one or more processors 215 to implement hyperledger fabric 150, SSC 160, IoT Domain 170, SEC 180, security 175, and event manager 185 and to read and write the blockchain ledger 135 to memory 225.

Figure 5A:
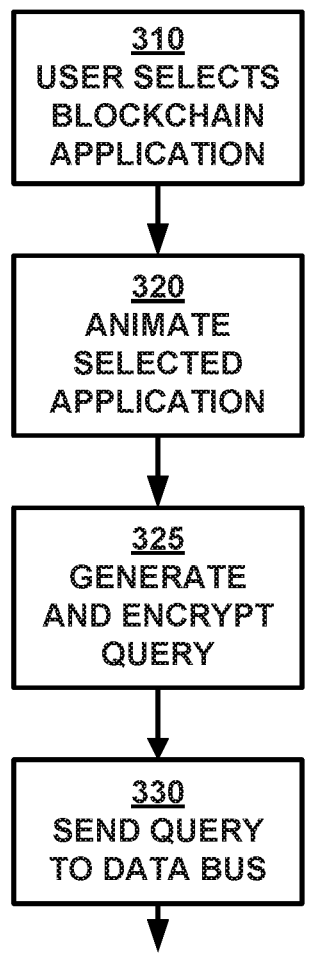
FIG. 5A-5E are flowcharts illustrating an example facilitation of transactions between an IoT device and a blockchain ledger according to techniques of the present disclosure.

FIGS. 5A-5E are flowcharts illustrating a method 300 of a data bus 120 facilitating a blockchain transaction by an IoT device. In this example, data bus 120, blockchain network 190, peers with working ledger 135 and smart contract 195 exist with the proper accounts, security elements and membership services already in place. In FIG. 5A, a user may select one of the blockchain applications 110 of IoT device 100, for example, event horizon where the user would like a cost volume profit analysis graph displayed for a supply chain (310). IoT device 100 may then animate the event horizon blockchain application 100 in display 115 to an event horizon feed display (320). The user then may attempt to query a blockchain ledger 135. The IoT device 100 may then respond and generate and encrypt the query using a private key, for example, stored in memory within IoT device 100 (325).

Figure 5B:
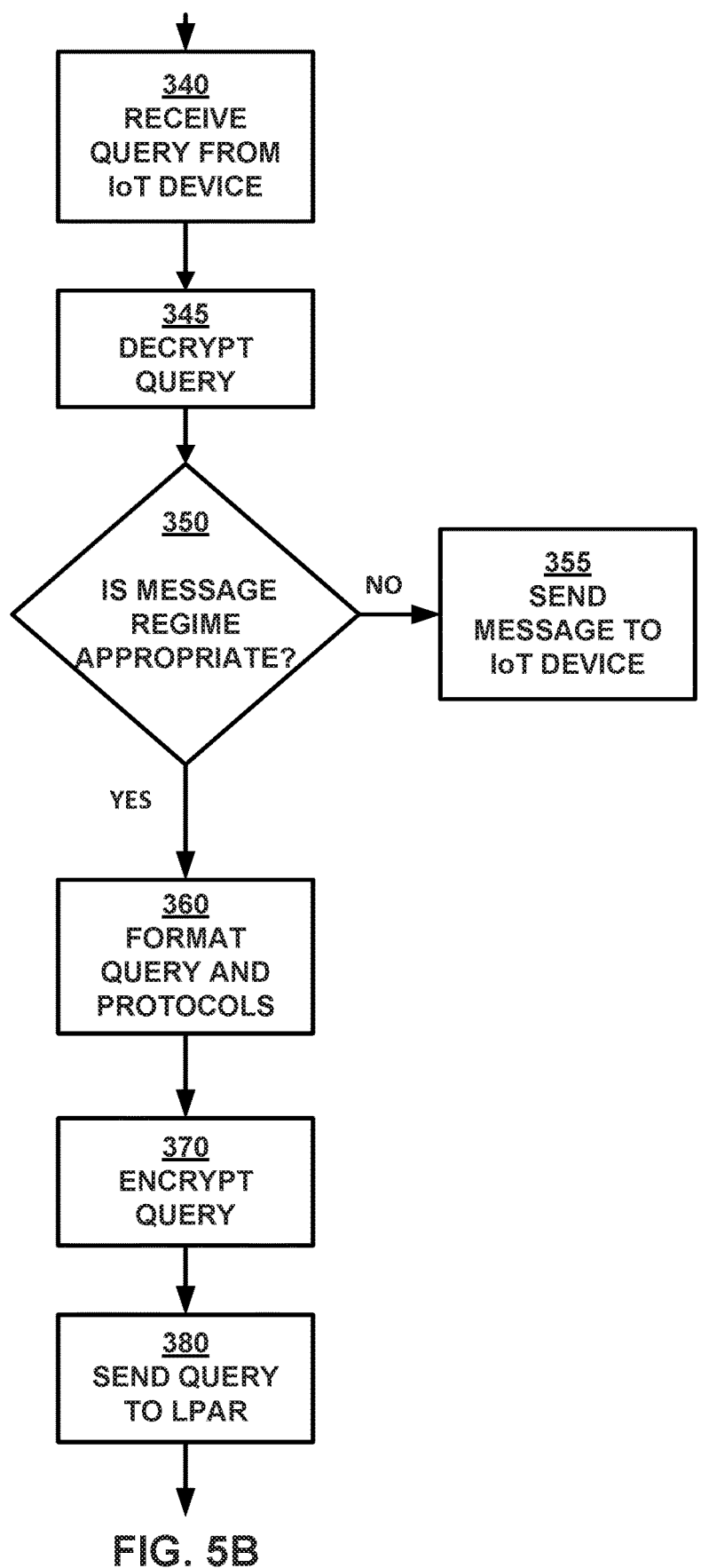

Referring to FIG. 5B, data bus 120 receives the query from IoT device 100 (340). Security 122 of the data bus 120 may then decrypt the query, using a public key for example (345). The public key may be stored in memory 130, for example.

Data bus 120 then may determine if the message regime is appropriate or correct (350). If it is not, data bus 120 may send a message back to the IoT device indicating that the transaction will not occur (355).

If the message regime is appropriate, message formatter 124 of data bus 120 may format the blockchain query and the protocols therein in a manner appropriate for the event horizon transaction and as expected or consumable by IoT domain 170A and hyperledger fabric 150A within LPAR 140A (360).

Security 122 of data bus 120 may encrypt the reformatted query with a private key associated with the IoT device 100 so it can transact with the blockchain ledger 135. The private key may be stored in memory 130, for example (370).

Channel manager 123 of data bus 120 may open a channel to LPAR 140A and data bus 120 may then send the encrypted and reformatted query to LPAR 140A containing the hyperledger fabric 150A associated with the IoT device 100 (380).

Figure 5C:
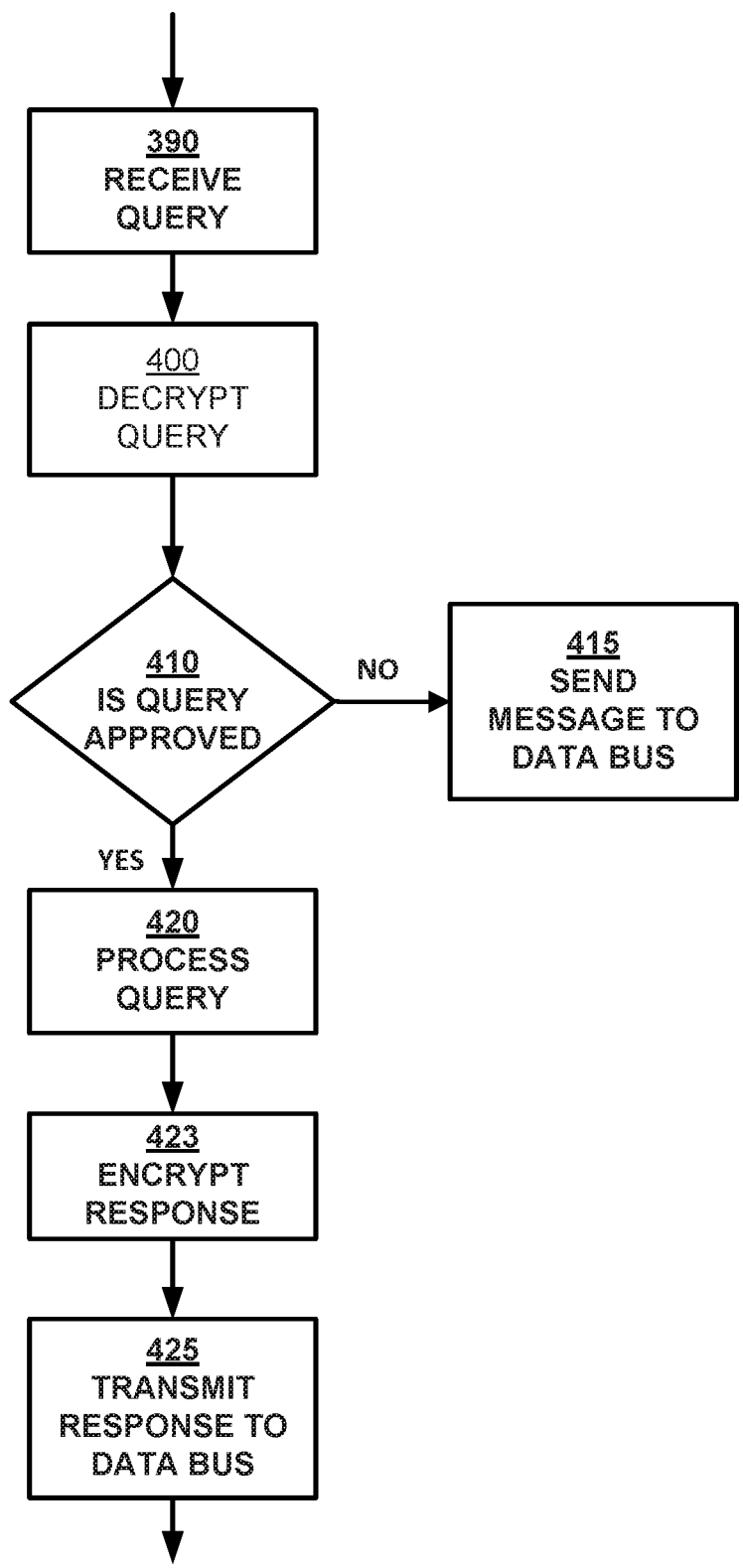

Referring to FIG. 5C, LPAR 140A receives the encrypted query from the data bus 120 (390). Security 175 of LPAR 140A may decrypt the query using a public key, which may be stored in memory within the sever upon which it is resident (400). Security 175 may determine if the query is security regime approved (410). If it is not, LPAR 140A may send a message back to data bus rejecting the transaction (415). If it is approved, IoT domain 170 may process the query (420). This processing may include processing a search of blockchain ledger 135, creating a record request, accessing or generating a materialized view of data within the blockchain ledger 135 and/or formatting response data, among others. Security 175 of LPAR 140A may encrypt a response (423).

LPAR 140A may transmit the encrypted response data to data bus 120 (425). This response data may be a materialized view of data within blockchain ledger 135.

Figure 5D:
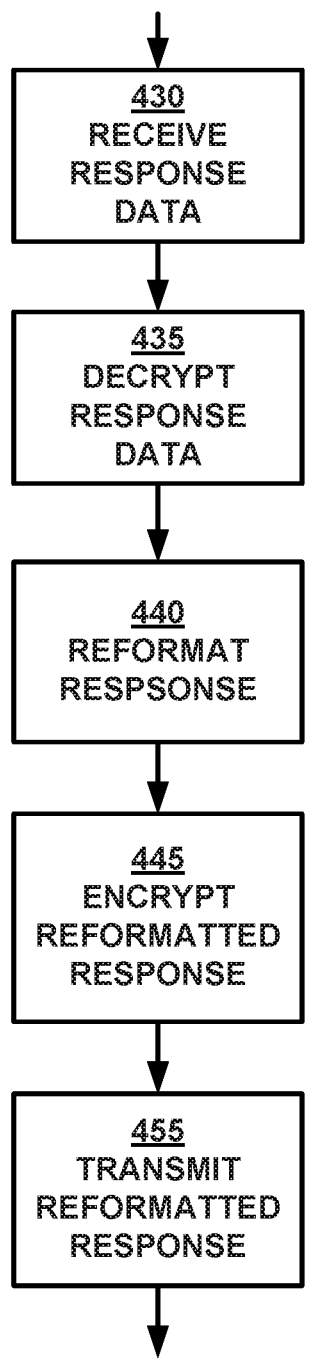

Referring to FIG. 5D, data bus 120 may receive the response data from LPAR 140A (430). Security 122 of data bus 120 may then decrypt the response data using a public key, for example, stored in memory 130 (435). Final formatter 126 of data bus 120 may reformat the data and amend the protocols of the decrypted response data in a fashion so that is consumable by IoT device 100, for example to enable IoT device 100 to display the data on display 115 (440). In the example where the IoT device 100 is a smartwatch, it may be an Android 2.0 smartwatch with a well-defined API and the response data may be reformatted to meet the specifications of that API. Security 122 of data bus 120 may then encrypt the reformatted response using a private key, for example, that may be stored in memory 130 (445). Data bus then may transmit the reformatted response to IoT device 100 (455).

Figure 5E:
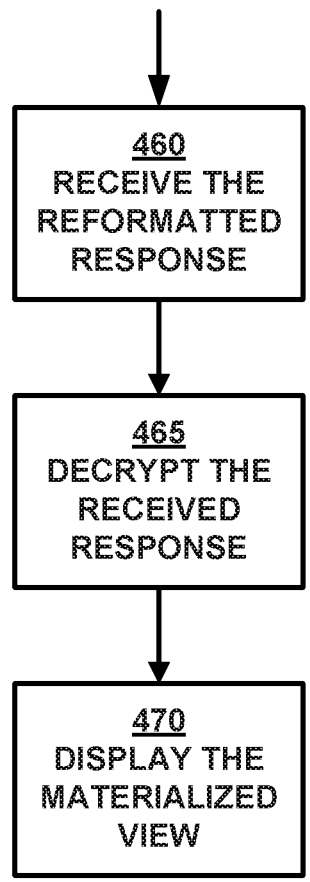

Referring to FIG. 5E, IoT device 100 may receive the encrypted and reformatted response (460). IoT device 100 may then decrypt the encrypted and reformatted response using a public key, for example (465). IoT device 100 may then display the materialized view of the data within the blockchain ledger 135 on display 115.

In another example, the user may select a ticket purchase application on IoT device 100 to purchase an airline ticket. Again, data bus 120, blockchain network 190, peers with working ledger 135 and smart contract 195 should exist with the proper accounts, security elements and membership services already in place. This example would be similar to the example discussed with respect to FIGS. 5A-5E. However, the LPAR, hyperledger fabric, SSC, IoT domain, SEC, blockchain ledger, smart contract, security and/or event manager may be different because IoT device 100 may be accessing a different blockchain ledger.

Channel manager 123 of the data bus 120 may configure a different channel to communicate with the LPAR. Message formatter 124, parameter enumerator and formatter 125, and final formatter 126 may format data and parameters differently to facilitate communications between the ticket purchase application and the LPAR.

In the ticket purchase example, referring to FIG. 5A, the user may select the ticket purchase blockchain application (310). The IoT device 100 may then animate the event horizon blockchain application 100 in display 115 to display a ticket purchase feed (320). The user then may attempt to query a blockchain ledger 135 to purchase a plane ticket, for example. The IoT device 100 may then respond and generate and encrypt the query using a private key, for example, stored in memory within IoT device 100 (325).

Referring to FIG. 5B, data bus 120 receives the query from the IoT device 100 (340). Security 122 of the data bus 120 may then decrypt the query, using a public key for example (345). The public key may be stored in memory 130, for example.

Data bus 120 then may determine if the message regime is appropriate (350). If it is not, Data bus 120 may send a message back to the IoT device indicating that the transaction will not occur (355).

If the message regime is appropriate, message formatter 124 of data bus 120 may format the query and the protocols in a manner appropriate for the ticket purchase and as expected by and consumable by IoT domain 170A and hyperledger fabric 150A of LPAR 140A (360).

Security 122 of data bus 120 may encrypt the reformatted query with a private key associated with the IoT device 100 so it can transact with the blockchain ledger 135. The private key may be stored in memory 130, for example (370).

Channel manager 123 of data bus 120 may open a channel to LPAR 140A and data bus 120 may then send the encrypted and reformatted query to LPAR 140A containing the hyperledger fabric 150A associated with the IoT device 100 (380).

Referring to FIG. 5C, LPAR 140A receives the encrypted query from the data bus 120 (390).

Security 175 of LPAR 140A decrypts the query using a public key, which may be stored in memory within the sever upon which it is resident (400). Security 175 may determine if the query is security regime approved (410). If it is not, LPAR 140A may send a message back to data bus rejecting the transaction (415). If it is approved, IoT domain 170 may process the query (420). In this example, it may include a search of blockchain ledger 135 for available tickets, creating a record request to purchase a ticket, accessing or generating a materialized view of data within the blockchain ledger 135 and/or formatting response data, among others. Security 175 of LPAR 140A may encrypt a response.

LPAR 140A may transmit the encrypted response data to data bus 120 (425). This response data may be a materialized view of data within blockchain ledger 135.

Referring to FIG. 5D, data bus 120 may receive the response data from LPAR 140A (430). Security 122 of data bus 120 may then decrypt the response data using a public key, for example, stored in memory 130 (435). Final formatter 126 and parameter enumerator and formatter 125 of data bus 120 may reformat the data and amend the protocols of the decrypted response data in a fashion so that is consumable by IoT device 100, for example to enable IoT device 100 to display the data on display 115 (440). In the example where the IoT device 100 is a smartwatch, it may be an Android 2.0 smartwatch with a well-defined API and the response data may be reformatted to meet the specifications of that API. Security 122 of data bus 120 may then encrypt the reformatted response using a private key, for example, that may be stored in memory 130 (445). Data bus then may transmit the reformatted response to the IoT device (455).

Referring to FIG. 5E, IoT device 100 may receive the encrypted and reformatted response (460). IoT device may then decrypt the encrypted and reformatted response using a public key, for example (465). IoT device 100 may then display the materialized view of the data, such as a purchased ticket, within the blockchain ledger 135 on display 115.

Figure 6:
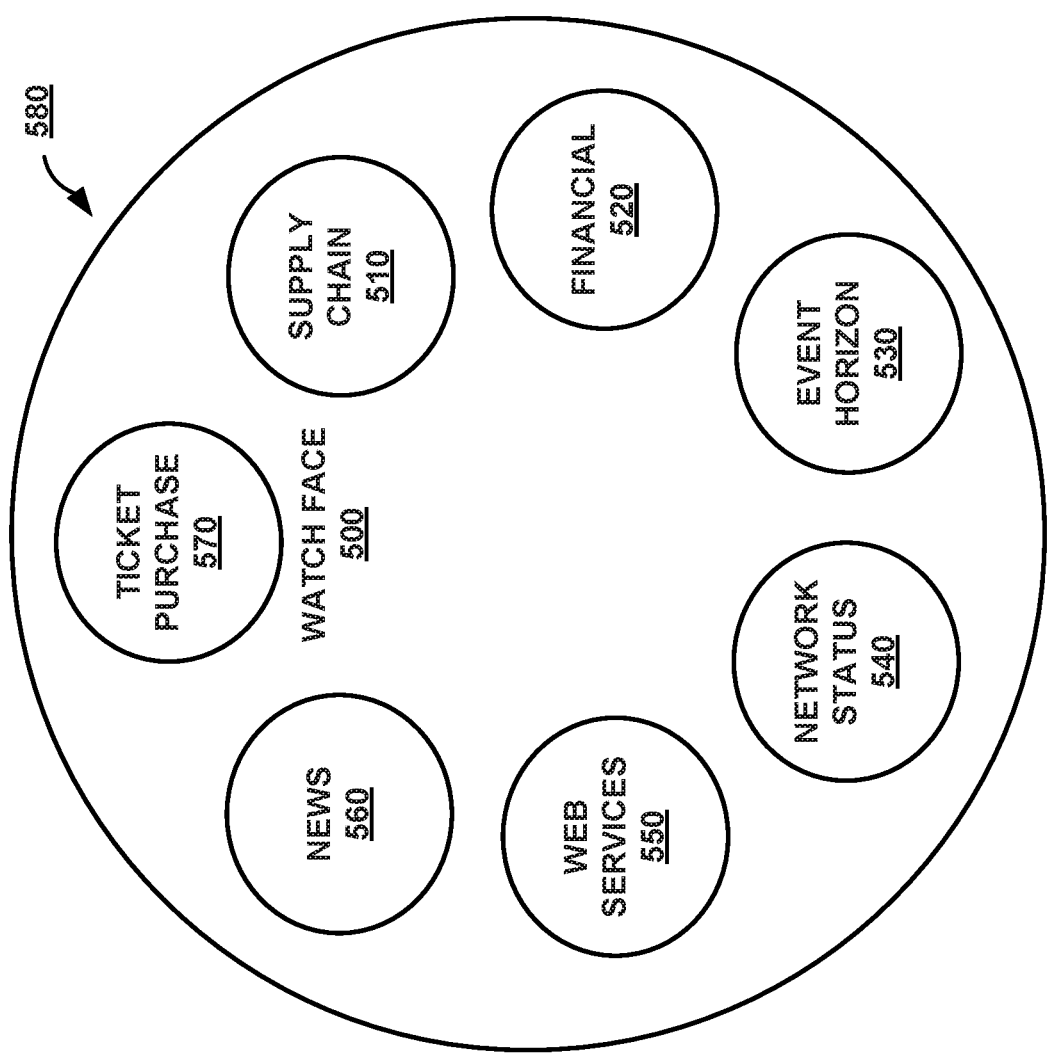
FIG. 6 is a block diagram of an example of a smartwatch according to techniques of the present disclosure.

FIG. 6 is a block diagram of a smartwatch face. In one example, display 115 of IoT device may be a smartwatch face 500. In some examples, smartwatch face 500 displays a graphical user interface of a plurality of complications 510-570. In some examples, each of these complications may be activated by a user touching an icon of each complication 510-570. These complications may include supply chain management 510, financial transactions 520, event horizon display 530, network status display 540, web services 550, news feed 560 and ticket purchase 570. A user may transact further with a given application or complication through finger gestures on smartwatch face 500, for example. In some examples, the complications may display menus that the user may select items from. In other examples, the user may transact further with a given complication through voice commands and/or by pushing buttons.

Figure 7A:
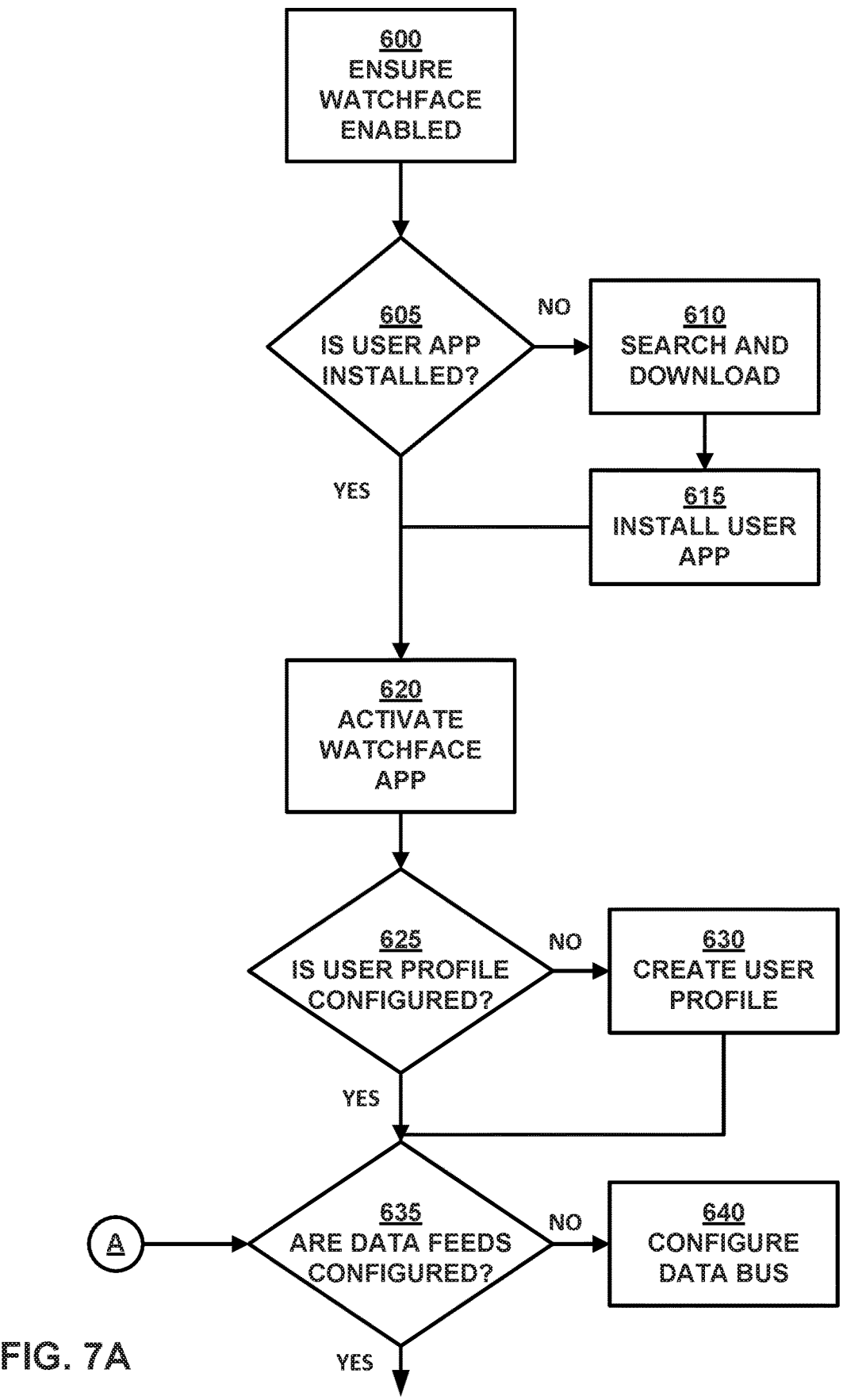
FIGS. 7A-7C are flowcharts illustrating the facilitation of transactions between a smartwatch and a blockchain ledger according to techniques of the present disclosure.
Figure 7B:
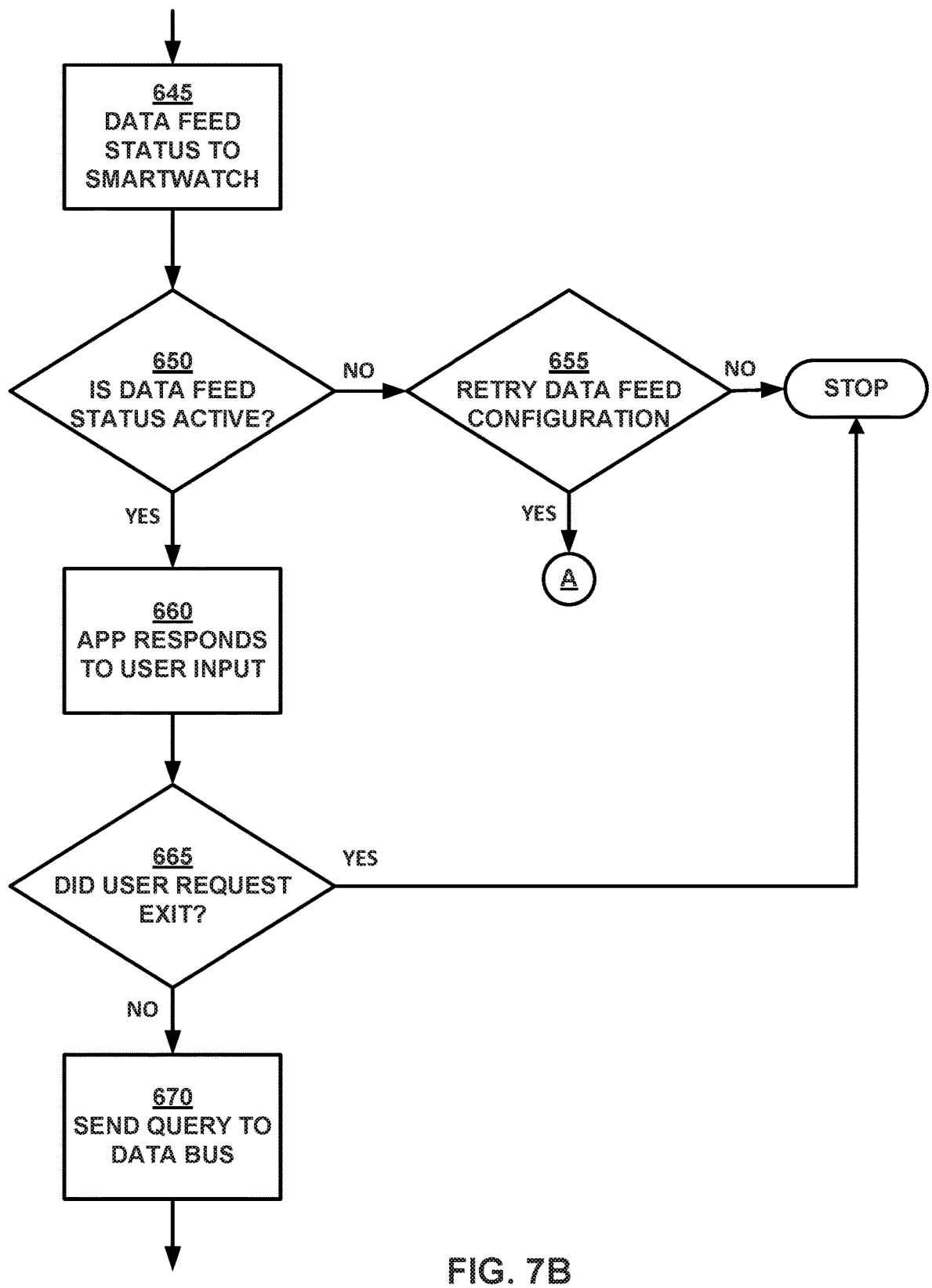
Figure 7C:
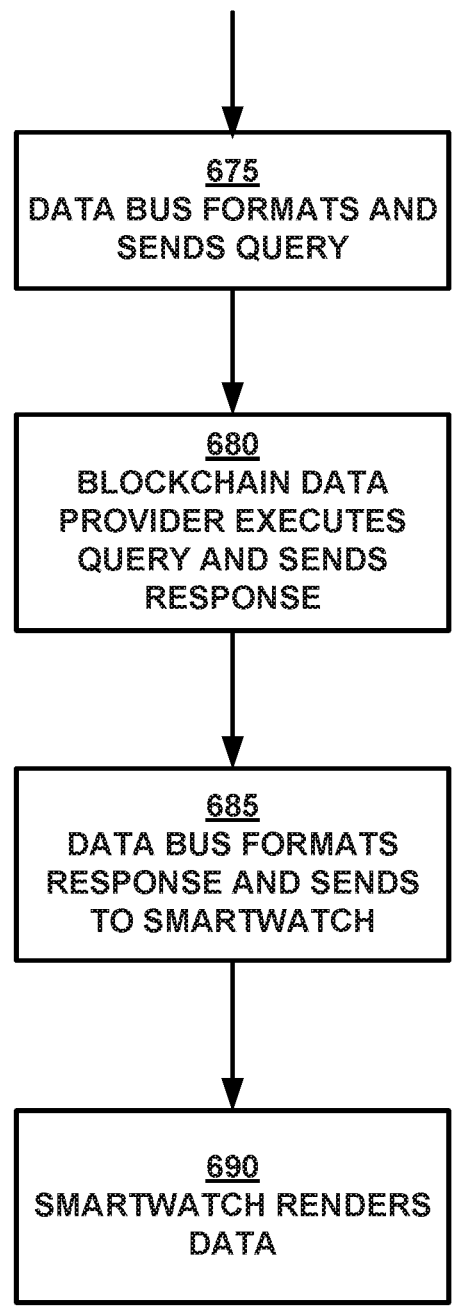

FIGS. 7A-7C are flowcharts illustrating a smartwatch transacting with a blockchain data provider through a data bus according to techniques of the present disclosure. While not every technique discussed with respect to FIGS. 5A-5E is discussed in this smartwatch example, the techniques of the examples of FIGS. 5A-5E may also be used with a smartwatch on their own or in combination with the example of FIGS. 7A-7C.

In FIG. 7A, smartwatch 580 or a user ensures smartwatch 580 has connectivity to the Internet, for example (600). This may be through a wireless or wired connection as discussed with respect to IoT device 100. If smartwatch 580 does not have connectivity, it may automatically turn on a wireless modem to connect to the Internet, for example, or it may prompt the user to connect smartwatch 580 to the Internet, for example.

Smartwatch 580 or the user may then determine if the appropriate blockchain user application (510, e.g.) is installed on smartwatch 580 (605). If it is not, smartwatch 580 or the user may search for the blockchain application (510, e.g.), on the Internet or in an app store, for example, and download the blockchain application (510, e.g.) onto smartwatch 580 (610). Smartwatch 580 or the user may then install the blockchain application (510, e.g.) on smartwatch 580 (615).

Once the blockchain application (510, e.g.) is installed, smartwatch 580 or the user may then activate the blockchain application (510, e.g.) on smartwatch face 500 (620). Smartwatch 580, through the blockchain application (510, e.g.), for example, may determine if there is a user profile configured for the user of the blockchain application (625). If there is not a user profile configured for the user of the blockchain application (510, e.g.), smartwatch 580 or the user may create the user profile (630). The user profile may be created through the blockchain application (510, e.g.). For example, the blockchain application (510, e.g.) may connect to edge services to create the blockchain user profile.

Once there is a user profile, smartwatch 580 may determine if the blockchain data feeds for the blockchain application (510, e.g.) are configured (635). In some examples, smartwatch 580 may determine if the blockchain data feeds are configured through the blockchain application (510, e.g.). If they are not configured, smartwatch 580 may configure data bus 120 for the blockchain data feeds (640). In some examples, smartwatch 580 may configure the data bus 120 for the blockchain data feeds through the blockchain application (510, e.g.). Blockchain application (510, e.g.) may request edge services to configure a basic data bus channel configuration for the data feeds. Data bus channel manager 123 may then allocate a channel(s) for the data feeds.

Referring to FIG. 7B, data bus 120 may then query the LPAR 140A, receive a data feed status from LPAR 140A and send the data feed status back to smartwatch 580 (645). Smartwatch 580 or the user may determine whether the data feed status is actively being displayed on smartwatch face 500 (650). If it is not, smartwatch may prompt the user to determine if the user wants to retry the configuration of the data feed (665). If the user indicates that they do not want to retry the configuration, for example, smartwatch 580 may close the blockchain application (510, e.g.). In another example, smartwatch 580 may close the blockchain application (510, e.g.) if the user does not respond to the prompt after a predetermined period of time. In yet another example, smartwatch 580 may leave the blockchain application (510, e.g.) open, but take no further action to obtain and/or display the data feeds. If the user indicates that they want to retry the configuration of the data feed, smartwatch 580 may go back (A) and check whether the data feeds are configured (635 in FIG. 7A) as discussed above. Alternatively, smartwatch 580 may configure data bus 120 for the blockchain data feeds without first rechecking whether the data feeds are configured (640 in FIG. 7A).

Referring back to FIG. 7B, if the data feed status is actively being displayed on smartwatch face 500, the blockchain application (510, e.g.) may respond to user input (660). In some examples, the user input includes gestures. In some examples, the user input includes voice commands. In some examples, the user input includes button pushes. Smartwatch 580 may monitor whether or not the user requests to exit the blockchain application (510, e.g.) (665). If the user requests to exit the blockchain application (510, e.g.), smartwatch 580 may close the blockchain application (510, e.g.). If the user has not requested to exit the application and has provided user input, smartwatch 580, through the blockchain application (510, e.g.) may send a query to data bus 120 (670).

Referring now to FIG. 7C, data bus 675 may receive the query, reformat the query and parameters as discussed above, and send the reformatted query to the blockchain data provider, which may be within LPAR 140A, for example (675). The blockchain data provider (LPAR 140A, e.g.) may execute the reformatted query and provide a response to data bus 120 (680). Data bus 120 may then receive the response, format the response as discussed above and send the reformatted response to smartwatch 580 (685). Smartwatch 580 may then render the data in the blockchain application (510, e.g.) on smartwatch face 500.

Aspects of the present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), CD-ROM, a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Various examples have been described. These and other examples are within the scope of the following claims.

The invention claimed is:

1. A system configured to facilitate transactions between an Internet of Things (IoT) device and a blockchain peer, the system comprising:
a memory configured to store a blockchain query from an IoT device and a blockchain response from a blockchain peer; and
one or more processors coupled to the memory, and configured to:
receive the blockchain query from the IoT device;
reformat the blockchain query so that it is in a first defined format that is consumable by the blockchain peer, wherein the reformatting the blockchain query comprises amending parameters in the blockchain query so that parameters in the reformatted blockchain query are consumable by the blockchain peer;
send the reformatted blockchain query to the blockchain peer;
receive a response from the blockchain peer;
reformat the response so that it is in a second defined format that meets the specifications of an application programming interface of the IoT device, wherein the reformatting the response comprises amending parameters in the response so that parameters in the reformatted response are consumable by the IoT device; and
send the re-formatted response to the IoT device.

2. The system of claim 1, wherein the one or more processors are further configured to decrypt the blockchain query, encrypt the reformatted blockchain query, decrypt the response, and encrypt the reformatted response.

3. The system of claim 1, wherein the one of more processors are further configured to scale a channel bandwidth based upon an amount of data in the blockchain query or response.

4. The system of claim 1, wherein the one of more processors are further configured to monitor a blockchain ledger for state changes.

5. The system of claim 1, wherein the one or more processors are further configured to send notifications to the IoT device.

6. The system of claim 1, wherein the one or more processors are further configured to monitor a plurality of blockchain feeds from the blockchain peer.

7. The system of claim 1, wherein the one or more processors are further configured to provide a channel for each of a plurality of blockchain applications on the IoT device and each of a respective plurality of blockchain feeds from the blockchain peer.

8. The system of claim 1, wherein the one or more processors are further configured to determine if a message regime is correct for the blockchain query and to notify the IoT device if the message regime is not correct.

9. A method of facilitating transactions between an Internet of Things (IoT) device and a blockchain peer comprising:
receiving a blockchain query from the IoT device;
reformatting the blockchain query so that it is in a first defined format that is consumable by the blockchain peer, wherein the reformatting the blockchain query comprises amending parameters in the blockchain query so that parameters in the reformatted blockchain query are consumable by the blockchain peer;
sending the blockchain query to the blockchain peer;
receiving a response from the blockchain peer;
reformatting the response so that it is in a second defined format that meets the specifications of an application programming interface of the IoT device, wherein the reformatting the response comprises amending parameters in the response so that parameters in the reformatted response are consumable by the IoT device; and
sending the response to the IoT device.

10. The method of claim 9, further comprising decrypting the blockchain query, encrypting the reformatted blockchain query, decrypting the response and encrypting the reformatted response.

11. The method of claim 9, further comprising scaling channel bandwidth based upon an amount of data in the blockchain query or response.

12. The method of claim 9, further comprising monitoring a blockchain ledger for state changes.

13. The method of claim 9, further comprising sending notifications to the IoT device.

14. The method of claim 9, further comprising monitoring a plurality of blockchain feeds from the blockchain peer.

15. The method of claim 9, further comprising providing a channel for each of a plurality of blockchain applications on the IoT device and each of a respective plurality of blockchain feeds from the blockchain peer.

16. The method of claim 9, further comprising determining if a message regime is correct for the blockchain query and notifying the IoT device if the message regime is not correct.

17. A computer-readable storage medium comprising instructions for causing one or more programmable processors to:
receive a blockchain query from an Internet of Things (IoT) device;
reformat the blockchain query so that it is in a first defined format that is consumable by a blockchain peer, wherein the reformatting the blockchain query comprises amending parameters in the blockchain query so that parameters in the reformatted blockchain query are consumable by the blockchain peer;
send the blockchain query to the blockchain peer;
receive a response from the blockchain peer;
reformat the response so that it is in second defined format that meets the specifications of an application programming interface of the IoT device, wherein the reformatting the response comprises amending parameters in the response so that parameters in the reformatted response are consumable by the IoT device; and
send the response to the IoT device.

* * * * *